(No Model.)

W. R. BLANEY.
TRAP.

No. 381,524. Patented Apr. 24, 1888.

WITNESSES:
C. R. Appleton.
Thomas A. Tallow.

INVENTOR:
William R. Blaney,
PER C. A. Straw & Co.,
ATTYS.

UNITED STATES PATENT OFFICE.

WILLIAM R. BLANEY, OF SWAMPSCOTT, MASSACHUSETTS.

TRAP.

SPECIFICATION forming part of Letters Patent No. 381,524, dated April 24, 1888.

Application filed December 27, 1887. Serial No. 258,949. (No model.)

*To all whom it may concern:*

Be it known that I, WILLIAM R. BLANEY, of Swampscott, in the county of Essex, State of Massachusetts, have invented a certain new and useful Improvement in Animal-Traps, of which the following is a description sufficiently full, clear, and exact to enable any person skilled in the art or science to which said invention appertains to make and use the same, reference being had to the accompanying drawings, forming part of this specification, in which—

Figure 1:
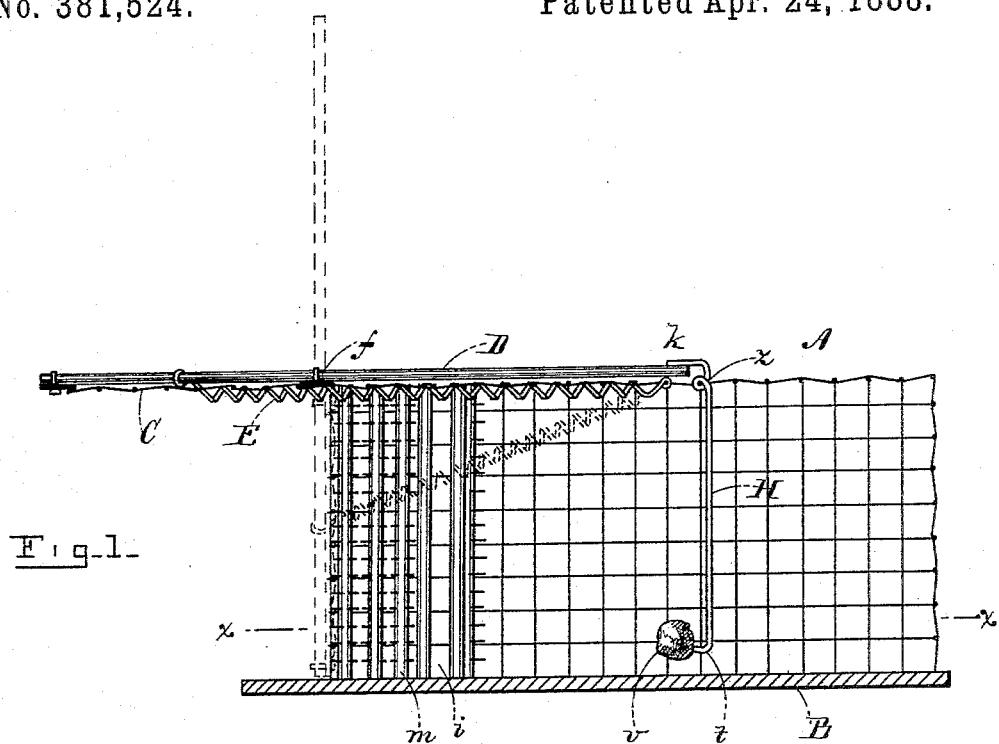
Figure 2:
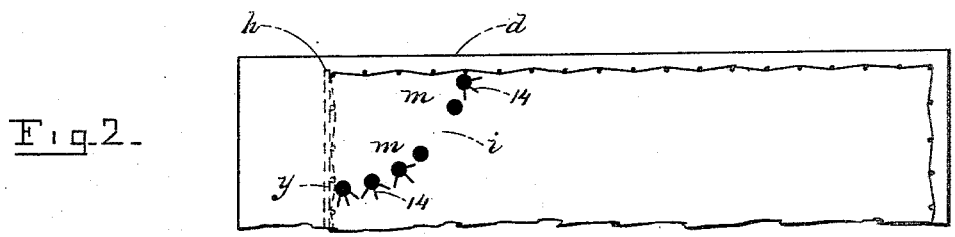

Figure 1 is an enlarged vertical longitudinal section of my improved trap represented as set; Fig. 2, a horizontal section taken on line $x$ $x$ in Fig. 1, and Fig. 3 an isometrical perspective view showing the trap sprung.

Like letters and figures of reference indicate corresponding parts in the different figures of the drawings.

My invention relates to the class of traps known as "box-traps," and which are employed principally in catching rats, mice, squirrels, and other small animals; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

Figure 3:
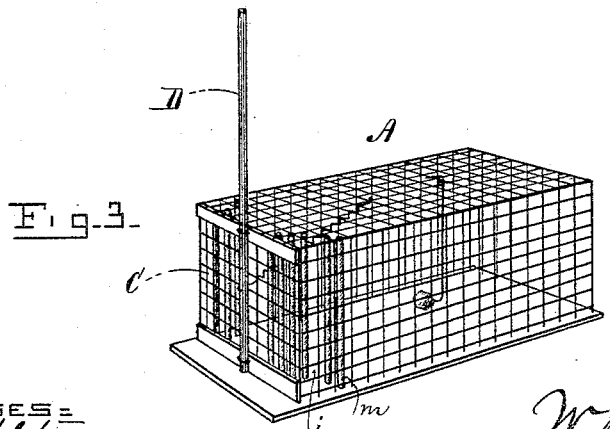

In the drawings, A represents the body of the trap; B, the bottom; C, the door, and D the lever. The body is composed of wire-cloth, which may be secured to the bottom B in any suitable manner, and is preferably rectangular in shape, as shown in Fig 3. One end of the body is open and provided with a door, C, which is hinged at $f$ to the upper portion thereof in the usual manner. A lever, D, is secured to the door, said bar extending upwardly above the same, as best seen in Fig. 3. A coiled spring, E, has one of its ends secured to the door near its bottom, and the other to the top of the body A, as shown in Fig. 1, said spring being disposed within said body and acting contractively to shut the door and hold it closed when the trap is sprung.

A pendulous rod, H, is pivoted at $z$ in the upper portion of the body A, the lower end of said rod being provided with a hook, $t$, for holding the bait $v$, and the upper portion with a horizontally-arranged short arm, $k$, adapted to engage the lever D when the trap is set and hold the door C open in the usual manner.

A series of guards, $m$, are disposed within the body of the trap at each side of the closed door C, said guards consisting of stout bars or wires, which are arranged vertically and secured to the top and bottom of said body. Each set of the guards is placed in the arc of a circle extending from the side of the body at $d$ to the door at $y$, as best seen in Fig. 2, their object being to prevent the rat or other animal, after it is caught, from escaping from the trap by forcing its way out between the side of the door and end of the trap at $h$, this being the point usually assailed in such cases.

It is well known that all caged animals and those caught in traps of this character nearly always seek to escape through the largest opening accessible; also, that in their endeavors to escape they usually avoid attacking any portion of the cage or trap which injures them or inflicts pain. In constructing my improved trap I have availed myself of these facts by so arranging the guard-wire $m$ as to leave a large opening, $i$, near the center of each set and providing the wires at each side of said opening with barbs 14.

As the opening or space $i$ is not large enough to permit the rat or other animal to pass through and escape by forcing the door open at $h$, but is larger than the opening between any other pair of the guard-wires, it will devote all of its exertions to escaping through the opening $i$, instead of trying to escape at some more vulnerable point. In case it should try to reach the corner $h$ by passing between the wires at either side of the opening $i$, it will be pricked by the barbs 14 and again seek said opening.

I have found that the guard-wires serve to prevent the animal from escaping in many instances even when two of said wires are not so arranged as to leave the large space $i$, and I do not therefore confine myself to the use of the barbs 14 on certain of said wires; nor to providing both sets of guards with large openings $i$, as when one set is so provided it will usually suffice; nor to using the trap for small animals, as a trap constructed on the same principle of stronger materials is well adapted for large game.

Having thus explained my invention, what I claim is—

1. In a cage-trap, the combination, with the body, an outwardly-swinging end door pivoted across its upper edge, and means for setting, tripping, and closing said door, of the vertical bars $m\ m$, extending from top to bottom of the cage and arranged in the arc of a circle around each vertical side corner of the door, substantially as described.

2. In a cage-trap, the combination, with the body, an outwardly-swinging end door pivoted across its upper edge, and means for setting, tripping, and closing said door, of the vertical bars $m\ m$, extending from top to bottom of the cage and arranged in the arc of a circle around each vertical side corner of the door, two of said bars being left a greater distance apart than the others, forming a space, $i$, substantially as described.

3. In a cage-trap, the combination, with the body, an outwardly-swinging end door pivoted across its upper edge, and means for setting, tripping, and closing said door, of the vertical bars $m\ m$, extending from top to bottom of the cage and arranged in the arc of a circle around each vertical side corner of the door, certain of said bars having radially-projecting barbs 14, substantially as described.

4. In a cage-trap, the combination, with the body, an outwardly-swinging end door pivoted across its upper edge, and means for setting, tripping, and closing said door, of the vertical bars $m\ m$, extending from top to bottom of the cage and arranged in the arc of a circle around each vertical side corner of the door, two of said bars being left plain and a greater distance apart than the others, forming space $i$, and the remainder of said bars provided with radially-projecting barbs 14, substantially as described.

WILLIAM R. BLANEY.

Witnesses:
O. M. SHAW,
E. M. SPINNEY.